United States Patent
Tu et al.

(10) Patent No.: US 11,158,301 B2
(45) Date of Patent: Oct. 26, 2021

(54) METHOD FOR ELIMINATING SPECIFIC OBJECT VOICE AND EAR-WEARING AUDIO DEVICE USING SAME

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW); Kuei-Ting Tai, New Taipei (TW); Chih-Ta Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/100,646

(22) Filed: Nov. 20, 2020

(65) Prior Publication Data

US 2021/0248992 A1    Aug. 12, 2021

(30) Foreign Application Priority Data

Feb. 12, 2020    (TW) ................................. 109104420

(51) Int. Cl.
- *H04R 3/00*    (2006.01)
- *G10L 17/06*    (2013.01)
- *G10K 11/178*    (2006.01)
- *H04R 1/40*    (2006.01)

(52) U.S. Cl.
CPC .. *G10K 11/17885* (2018.01); *G10K 11/17873* (2018.01); *G10L 17/06* (2013.01); *H04R 1/406* (2013.01); *H04R 3/005* (2013.01); *G10K 2210/1081* (2013.01); *G10K 2210/3046* (2013.01); *G10K 2210/3215* (2013.01)

(58) Field of Classification Search
CPC .......... H04R 3/005; H04R 1/406; G10L 17/06
See application file for complete search history.

(56) References Cited

U.S. PATENT DOCUMENTS

2018/0295240 A1    10/2018    Dickins et al.

FOREIGN PATENT DOCUMENTS

| CN | 103733602 A | 4/2014 |
|---|---|---|
| CN | 105679329 A | 6/2016 |
| TW | 201225066 A1 | 6/2012 |
| TW | 201820315 A | 6/2018 |

OTHER PUBLICATIONS

Office Action for Taiwanese Application No. 109104420, dated Oct. 23, 2020, 7 pages.

*Primary Examiner* — Ping Lee
(74) *Attorney, Agent, or Firm* — Birch, Stewart, Kolasch & Birch, LLP (57) ABSTRACT

A method for eliminating a specific object voice and an ear-wearing audio device using the same are provided. The ear-wearing audio device includes a plurality of voice receiving units, a voice direction tracking unit, a direction enhancement unit, a window cutting unit, a voiceprint recognition unit, a voice cancellation unit and two speakers. The voice receiving units are arranged in an array to obtain a sound signal. The voice direction tracking unit is configured to track a plurality of sound sources to obtain a plurality of sound source directions. The voiceprint recognition unit determines whether the sound signal contains a specific object voice in each of the sound source directions. If the sound signal contains the specific object voice in one of the sound source directions, the voice cancellation adjusts a field pattern using a beamforming technique to eliminate the specific object voice.

20 Claims, 7 Drawing Sheets

METHOD FOR ELIMINATING SPECIFIC OBJECT VOICE AND EAR-WEARING AUDIO DEVICE USING SAME

This application claims the benefit of Taiwan application Serial No. 109104420, filed Feb. 12, 2020, the subject matter of which is incorporated herein by reference.

BACKGROUND OF THE INVENTION

Field of the Invention

The invention relates in general to a voice processing method and an audio device using the same, and more particularly to a method for eliminating a specific object voice and the ear-wearing audio device using the same.

Description of the Related Art

In daily life, one may regard some people's talking in the vicinity as an interference. At times, one may wish to give his/her ears a break but at the same time does not want to miss other important voice message. Therefore, a specific object voice cancellation mechanism is provided to help the user achieve peace of mind.

However, an ordinary noise cancellation technique, which can only reduce the ambient noises and amplify voice signals, is still unable to eliminate a specific object voice to bring peace of mind to the user.

SUMMARY OF THE INVENTION

The present invention relates to a method for eliminating a specific object voice and an ear-wearing audio device using the same, which use a voice tracking technique and a beamforming technique to eliminate a specific object voice to help the user achieve peace of mind.

According to one embodiment of the present invention, an ear-wearing audio device with specific object voice cancellation mechanism is provided. The ear-wearing audio device includes a plurality of voice receiving units, a voice direction tracking unit, a direction enhancement unit, a window cutting unit, a voiceprint recognition unit, a voice cancellation unit and two speakers. The voice receiving units are arranged in an array to obtain a sound signal. The voice direction tracking unit is configured to track a plurality of sound sources to obtain a plurality of sound source directions. The direction enhancement unit is configured to adjust the voice receiving units to enhance the sound source directions. The window cutting unit is configured to cut the sound signal into a plurality of windows. The voiceprint recognition unit is configured to perform voiceprint recognition to each of the windows to determine whether the sound signal contains a specific object voice in each of the sound source directions. If the sound signal contains the specific object voice in one of the sound source directions, the voice cancellation adjusts a field pattern using a beamforming technique to eliminate the specific object voice. The speaker is configured to output the sound signal being eliminated the specific object voice to a left ear and a right ear.

According to another embodiment of the present invention, a method for eliminating a specific object voice is provided. The method for eliminating a specific object voice includes the following steps. A sound signal is obtained by a plurality of voice receiving units arranged in an array. A plurality of sound sources are tracked to obtain a plurality of sound source directions. The voice receiving units are adjusted to enhance the sound source directions. The sound signal is cut into a plurality of windows. Voiceprint recognition is performed to each of the windows to determine whether the sound signal contains a specific object voice in each of the sound source directions. If the sound signal contains the specific object voice in one of the sound source directions, a field pattern is adjusted using a beamforming technique to eliminate the specific object voice. The sound signal being eliminated the specific object voice is outputted to a left ear and a right ear.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
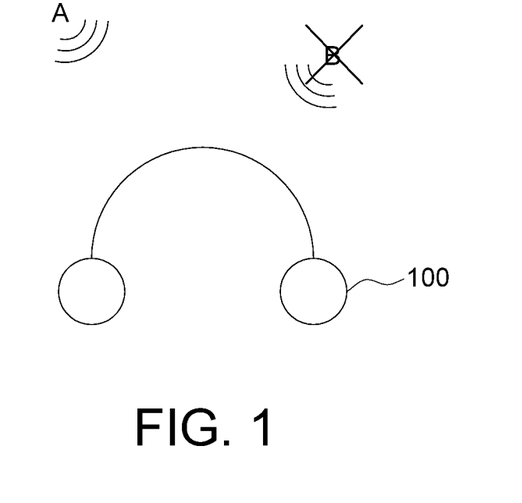
FIG. 1 is a schematic diagram of two specific object voices.

Referring to FIG. 1, a schematic diagram of specific object voice A and specific object voice B is shown. In daily life, the user may regard the specific object voice B as an interference and does not want to hear it. If the user directly turns off the ear-wearing audio device 100, the user will not hear the specific object voice A.

Figure 2:
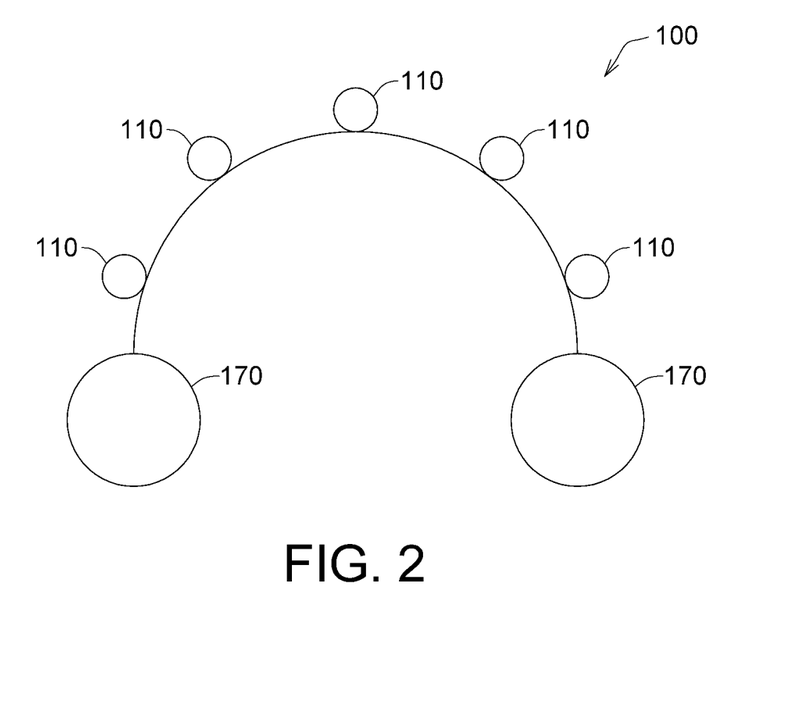
FIG. 2 is a schematic diagram of an ear-wearing audio device with specific object voice cancellation mechanism according to an embodiment.
Figure 3:
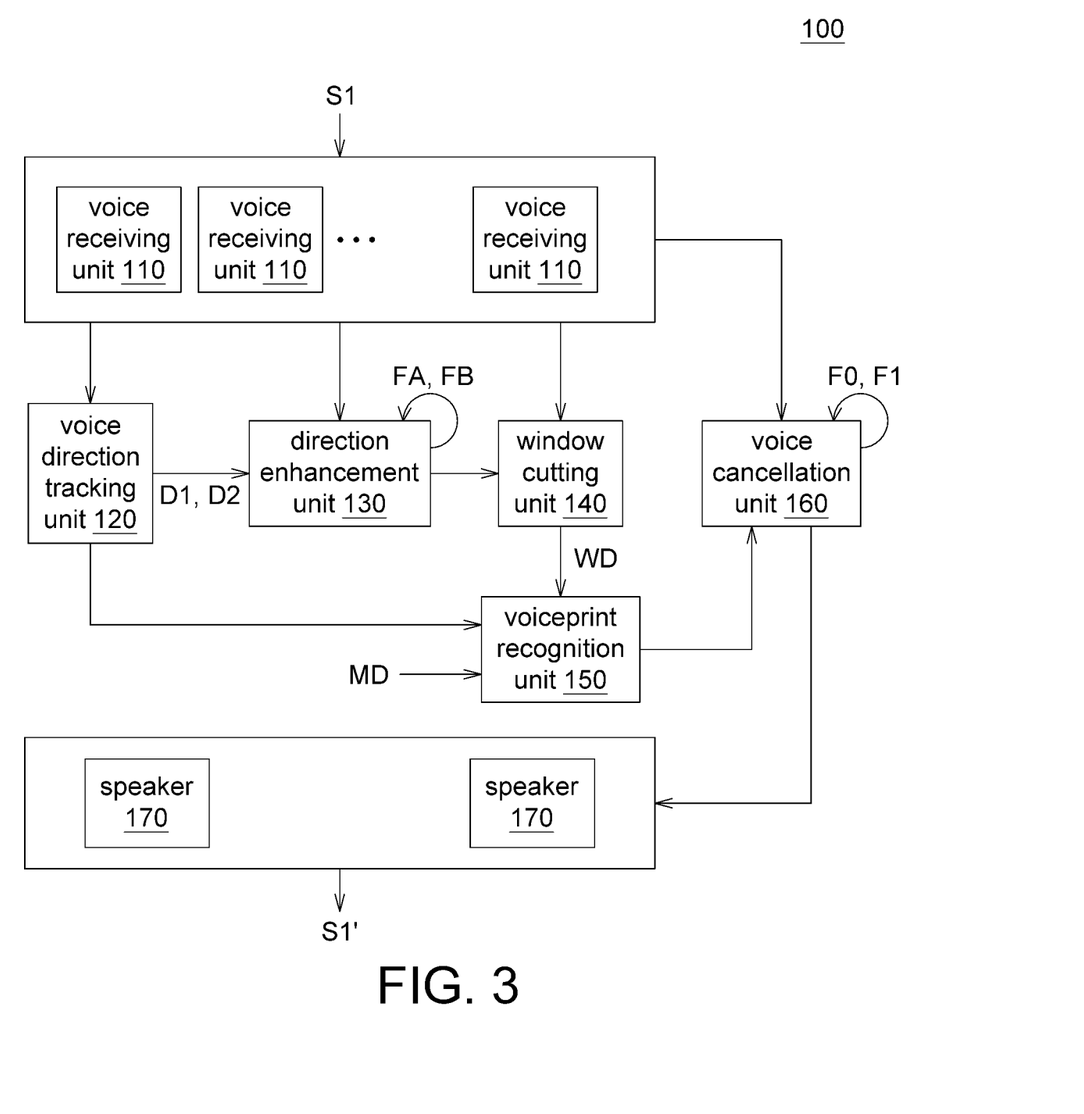
FIG. 3 is a block diagram of an ear-wearing audio device with specific object voice cancellation mechanism according to an embodiment.

Refer to FIG. 2 and FIG. 3. FIG. 2 is a schematic diagram of an ear-wearing audio device 100 with specific object voice cancellation mechanism according to an embodiment. FIG. 3 is a block diagram of an ear-wearing audio device 100 with specific object voice cancellation mechanism according to an embodiment. The ear-wearing audio device 100 can be realized by such as an earphone or a hearing aid. The ear-wearing audio device 100 includes a plurality of voice receiving units 110, a voice direction tracking unit 120, a direction enhancement unit 130, a window cutting unit 140, a voiceprint recognition unit 150, a voice cancellation unit 160, and two speakers 170. The voice receiving unit 110 can be realized by such as a microphone. The speaker 170 can be realized by such as a speaker. The voice direction tracking unit 120, the direction enhancement unit 130, the window cutting unit 140, the voiceprint recognition unit 150, and the voice cancellation unit 160 can all be realized by such as a circuit, a chip, a circuit board, a number of programming codes or a recording device storing the programming codes. After receiving an external sound signal S1, the ear-wearing audio device 100 can eliminate the specific object voice B and output a sound signal S1' to help the user achieve peace of mind. Detailed operations of each of the above elements are disclosed below with a flowchart.

Figure 4:
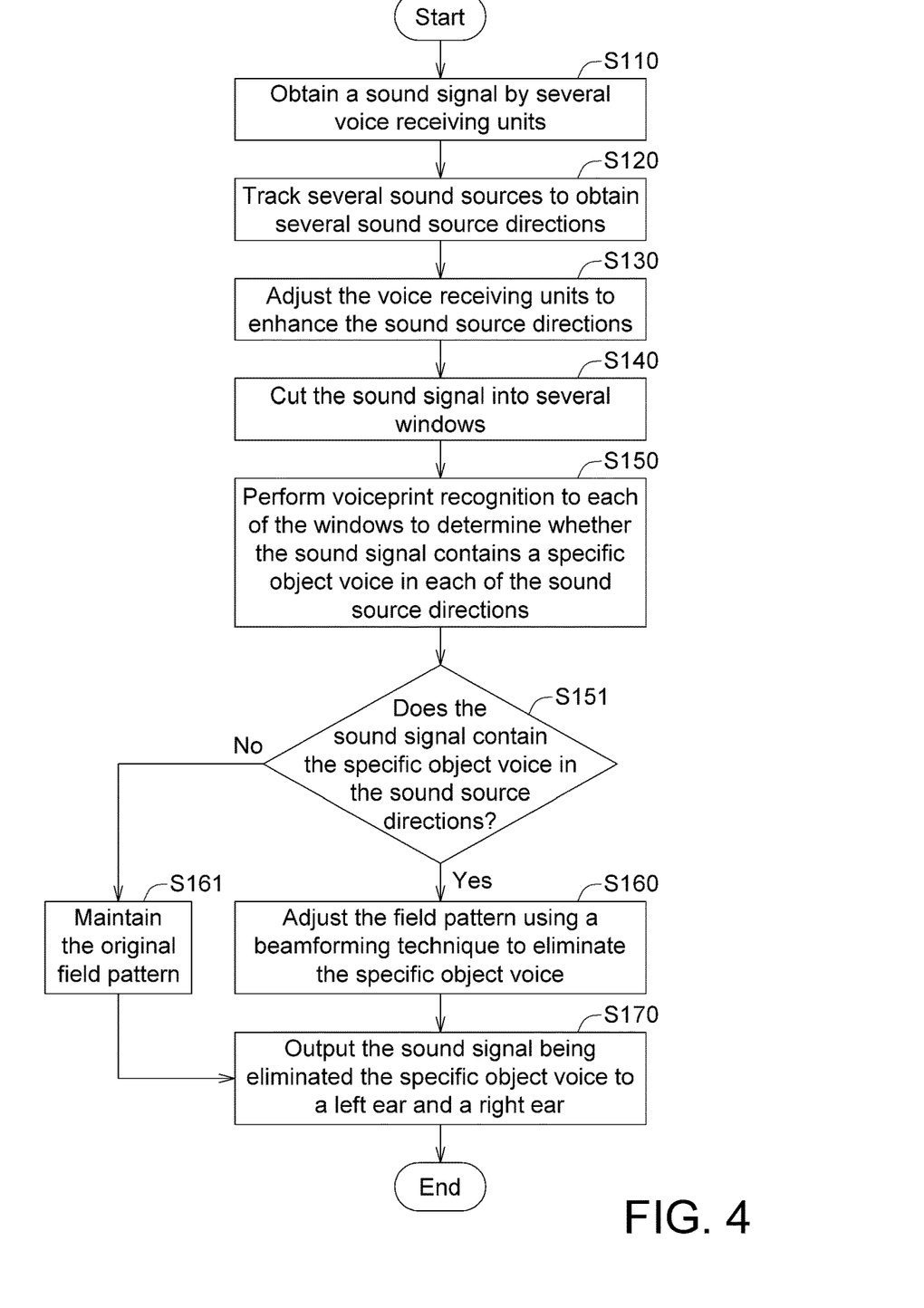
FIG. 4 is a flowchart of a method for eliminating a specific object voice according to an embodiment.

Referring to FIG. 4, a flowchart of a method for eliminating a specific object voice according to an embodiment is shown. In step S110, a sound signal S1 is obtained by a plurality of voice receiving units 110. As indicated in FIG. 2, the voice receiving units 110 are arranged in an array and face different directions. Thus, a specific voice receiving unit 110 mainly receives the specific object voice A, and another specific voice receiving unit 110 mainly receives the specific object voice B.

Figure 5:
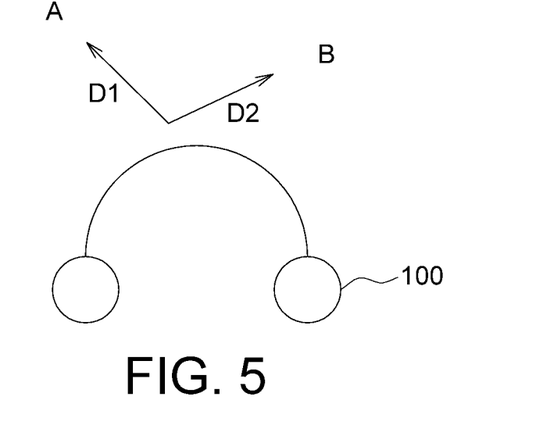
FIG. 5 is a schematic diagram of sound source directions according to an embodiment.

Then, the method proceeds to step S120, a plurality of sound sources are tracked by the voice direction tracking unit 120 to obtain sound source directions D1 and D2. Referring to FIG. 5, a schematic diagram of sound source directions D1 and D2 according to an embodiment is shown. The voice direction tracking unit 120 tracks the specific object voice A and the specific object voice B to obtain a sound source direction D1 and a sound source direction D2 respectively. In the present step, the voice direction tracking unit 120 tracks the sound sources using an interaural time difference (ITD) and a cross correlation function (CCF) to obtain the sound source directions D1 and D2.

Figure 6A:
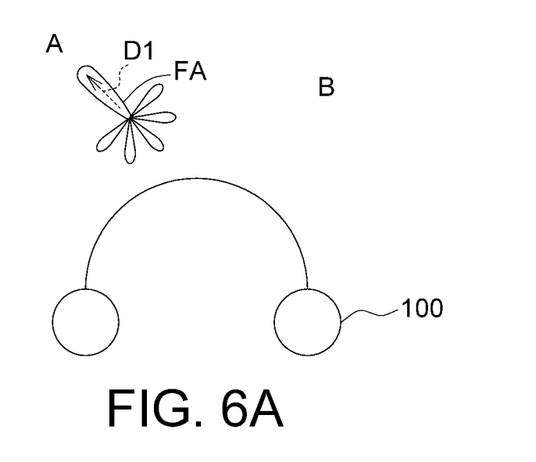
FIG. 6A is a schematic diagram of an enhanced field pattern of a specific object voice.
Figure 6B:
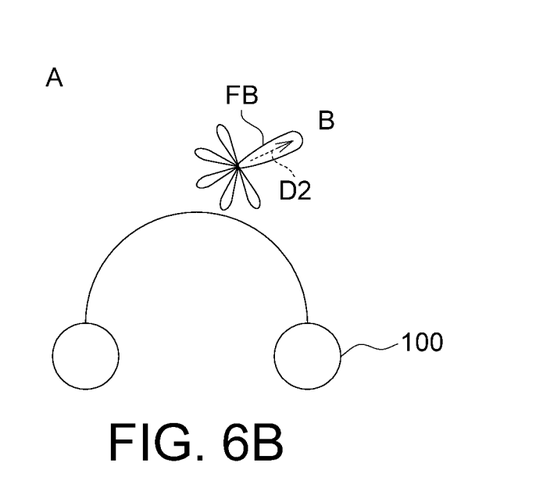
FIG. 6B is a schematic diagram of an enhanced field pattern of another specific object voice.

Then, the method proceeds to step S130, the voice receiving units 110 is adjusted by the direction enhancement unit 130 to enhance the sound source directions D1 and D2. Refer to FIGS. 6A to 6B. FIG. 6A is a schematic diagram of an enhanced field pattern FA of a specific object voice A. FIG. 6B is a schematic diagram of an enhanced field pattern FB of a specific object voice B. In the present step, the voice receiving unit 110 is adjusted by the direction enhancement unit 130 using a beamforming technique to enhance the sound source directions D1 and D2. As indicated in the enhanced field pattern FA of FIG. 6A, the beam facing the specific object voice A has a larger energy and therefore enhances the specific object voice A. As indicated in the enhanced field pattern FB of FIG. 6B, the beam facing the specific object voice B has a larger energy and therefore enhances the specific object voice B.

Figure 7:
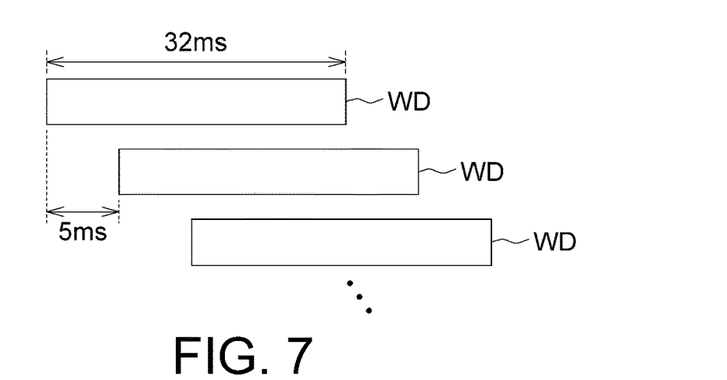
FIG. 7 is a schematic diagram of several windows according to an embodiment.

Then, the method proceeds to step S140, the sound signal S1 is cut into a plurality of windows WD by the window cutting unit 140. Referring to FIG. 7, a schematic diagram of several windows WD according to an embodiment is shown. In the present step, the window WD is greater than or equivalent to 32 milliseconds (ms) to help determine voiceprint recognition. Moreover, the interval between the windows WD is less than or equivalent to 5 milliseconds lest the user might feel screen delay.

Then, the method proceeds to step S150, voiceprint recognition is performed to each of the windows WD by the voiceprint recognition unit 150 to determine whether the sound signal S1 contains the specific object voice B in each of the sound source directions D1 and D2. In the present step, the recognition model MD for the specific object voice B is obtained by the voiceprint recognition unit 150, wherein the recognition model MD is trained and stored in the voiceprint recognition unit 150 in advance.

Then, the method proceeds to step S151, whether the sound signal S1 contains the specific object voice B in the sound source directions D1 and D2 is determined by the voiceprint recognition unit 150. If sound signal S1 does not contain the specific object voice B in the sound source direction D1, the method proceeds to step S161; if the sound signal S1 contains the specific object voice B in the sound source direction D2, the method proceeds to step S160.

Figure 8A:
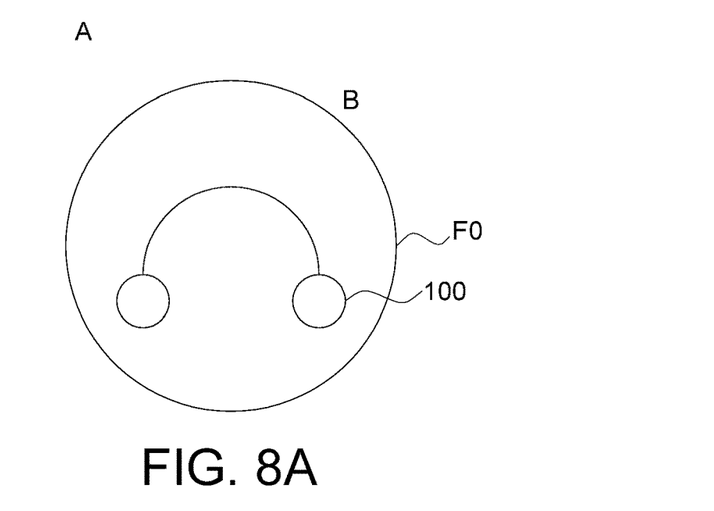
FIG. 8A is a schematic diagram of an original field pattern.

In step S161, the original field pattern is maintained by the voice cancellation unit 160 to keep the specific object voice A. Referring to FIG. 8A, a schematic diagram of an original field pattern F0 is shown. Under the original field pattern F0, the specific object voice A is kept.

Figure 8B:
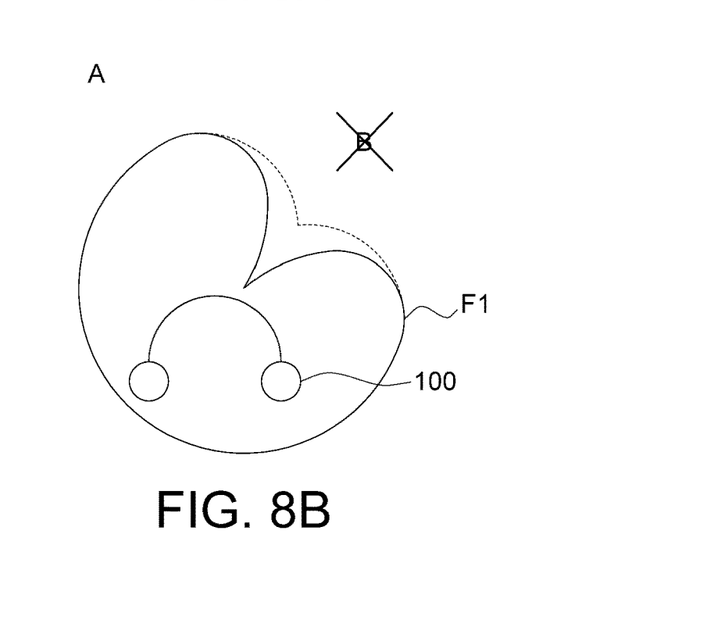
FIG. 8B is a schematic diagram of an adjusted field pattern.
Figure 9:
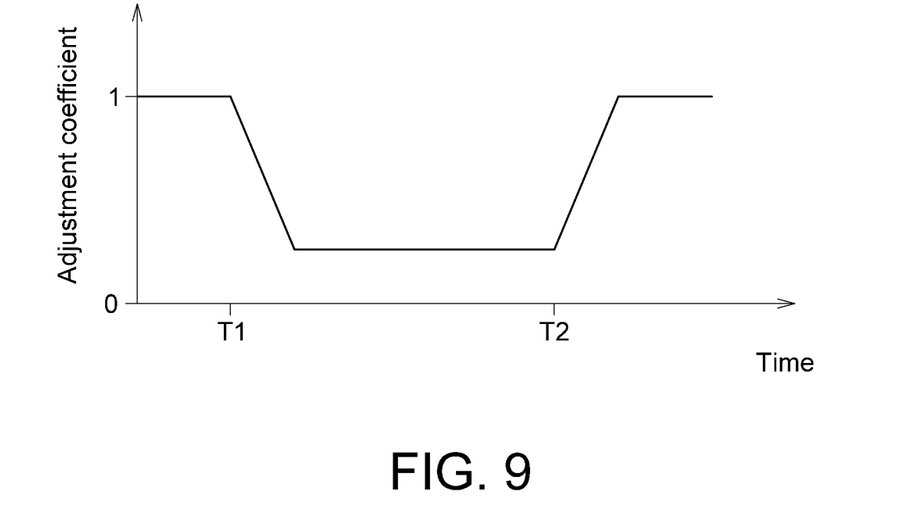
FIG. 9 is a schematic diagram of adjustment coefficient according to an embodiment.

In step S160, the field pattern is adjusted by the voice cancellation unit 160 using a beamforming technique to eliminate the undesired specific object voice B. Referring to FIG. 8B, a schematic diagram of an adjusted field pattern F1 is shown. Under the adjusted field pattern F1, the specific object voice B is weakened. In the present step, the voice cancellation unit 160 progressively adjusts the field pattern F1. Referring to FIG. 9, a schematic diagram of adjustment coefficient according to an embodiment is shown. At time point T1, the specific object voice B is recognized, and the voice cancellation unit 160 progressively decreases the adjustment coefficient to progressively adjust the field pattern F1. At time point T2, the specific object voice B is eliminated, and the voice cancellation unit 160 progressively increases the adjustment coefficient and the field pattern F1 is progressively restored to the original field pattern F0.

Then, the method proceeds to step S170, the sound signal S1' being eliminated the specific object voice B is outputted to a left ear and a right ear by the speaker 170.

Figure 10:
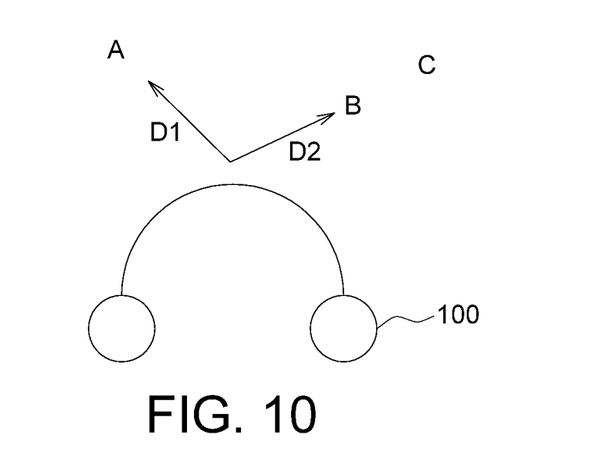
FIG. 10 is a schematic diagram of three specific object voices.
Figure 11:
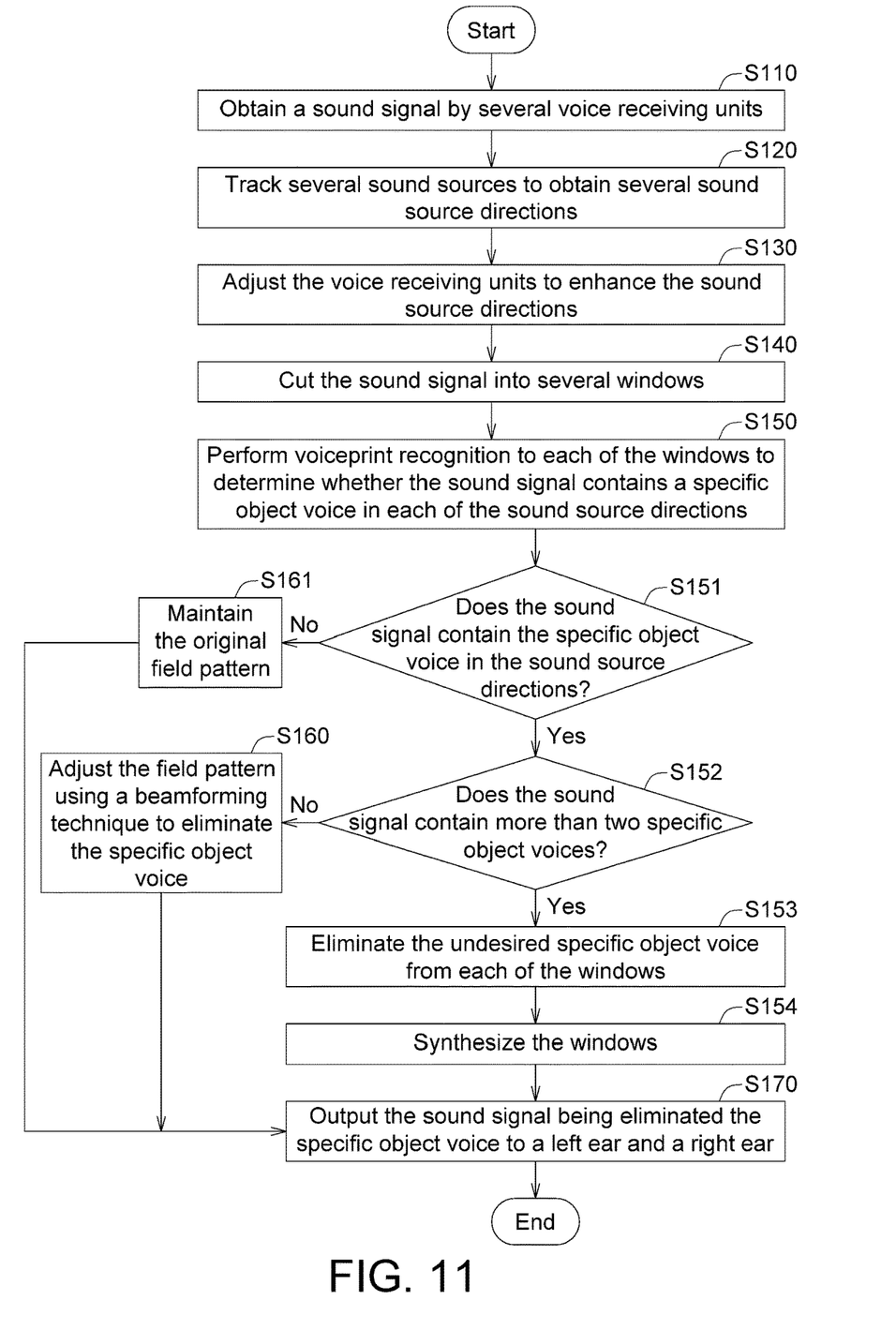
FIG. 11 is a flowchart of a method for eliminating a specific object voice according to another embodiment.

In a scenario, the same direction may contain two specific object voices, and extra processing is required. Referring to FIG. 10, a schematic diagram of three specific object voices A, B, and C is shown. The specific object voice A is in the sound source direction D1, but the specific object voices B and C are in the sound source direction D2. Referring to FIG. 11, a flowchart of a method for eliminating a specific object voice according to another embodiment is shown. In step S150, voiceprint recognition is performed to each of the windows WD by the voiceprint recognition unit 150 to determine whether the sound signal S1 contains the specific object voice B in each of the sound source directions D1 and D2. In the present step, the voiceprint recognition unit 150 obtains the recognition model MD for the specific object voice B.

Then, the method proceeds to step S151, whether the sound signal S1 contains the specific object voice B in the sound source directions D1 and D2 is determined by the voiceprint recognition unit 150. If the sound signal S1 does not contain the specific object voice B in the sound source direction D1, the method proceeds to step S161; if the sound signal S1 contains the specific object voice B in the sound source direction D2, the method proceeds to step S152.

In step S152, whether the sound signal S1 contains more than two specific object voices is determined by the voiceprint recognition unit 150. As indicated in FIG. 10, the sound signal S1 contains the specific object voice B and the specific object voice C in the sound source direction D2, therefore the method proceeds to step S153.

In step S153, the undesired specific object voice B is eliminated from each of the windows WD by the voice cancellation unit 160. In the present step, the voice cancellation unit 160 can eliminate the specific object voice B using an adaptive signal processing technique.

In step S154, the windows WD are synthesized by the voice cancellation unit 160. After the windows WD are synthesized, the sound source direction D2 only contains the specific object voice C, and the specific object voice B is eliminated from the sound source direction D2.

Then, the method proceeds to step S170, the sound signal S1' being eliminated the specific object voice B is outputted to a left ear and a right ear by the speaker 170.

Through the above embodiments, the undesired specific object voice B is smoothly eliminated and only the important specific object voice A is kept. During the process, the user does not feel any delay (the time different between the actual voice and the played voice is less than or equivalent to 5 milliseconds). In the above embodiments, the beamforming technique instead of the window synthesis technique is used, such that the adjusted sound signal S1' can keep fidelity and will not be distorted.

Besides, even in a noisy environment where the recognition of the window WD may be instable, the field pattern can be progressively adjusted, such that voice changes can be smoothed, and the user can have a comfortable hearing experienced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ear-wearing audio device with specific object voice cancellation mechanism, comprising:
   a plurality of voice receiving units, mounted on the head of a user, arranged in an array to obtain a sound signal;
   a voice direction tracking unit configured to track a plurality of sound sources based on the obtained sound signal to obtain a plurality of sound source directions;
   a direction enhancement unit configured to adjust the voice receiving units to enhance the sound source directions;
   a window cutting unit configured to cut the sound signal into a plurality of windows;
   a voiceprint recognition unit configured to perform voiceprint recognition to each of the windows to determine whether the sound signal contains a specific object voice in each of the sound source directions;
   a voice cancellation unit configured to adjust a field pattern using a beamforming technique to eliminate the specific object voice if the sound signal contains the specific object voice in one of the sound source directions; and
   two speakers, mounted on the head of the user, configured to output the sound signal with the specific object voice being eliminated to a left ear and a right ear.

2. The ear-wearing audio device with specific object voice cancellation mechanism according to claim 1, wherein the voice receiving units face different directions.

3. The ear-wearing audio device with specific object voice cancellation mechanism according to claim 1, wherein the voice direction tracking unit tracks the sound sources using an interaural time difference (ITD) and a cross correlation function (CCF) to obtain the sound source directions.

4. The ear-wearing audio device with specific object voice cancellation mechanism according to claim 1, wherein the direction enhancement unit adjusts the voice receiving units using a beamforming technique to enhance the sound source directions.

5. The ear-wearing audio device with specific object voice cancellation mechanism according to claim 1, wherein each of the windows is greater than or equivalent to 32 milliseconds (ms).

6. The ear-wearing audio device with specific object voice cancellation mechanism according to claim 1, wherein each interval between the windows is less than or equivalent to 5 milliseconds.

7. The ear-wearing audio device with specific object voice cancellation mechanism according to claim 1, wherein the voice cancellation unit progressively adjusts the field pattern.

8. The ear-wearing audio device with specific object voice cancellation mechanism according to claim 1, wherein the voice cancellation unit progressively adjusts the field pattern, and the voice cancellation unit progressively restores the field pattern.

9. The ear-wearing audio device with specific object voice cancellation mechanism according to claim 1, wherein the voice cancellation unit maintains the field pattern if the sound signal does not contain the specific object voice in one of the sound source directions.

10. The ear-wearing audio device with specific object voice cancellation mechanism according to claim 1, wherein a recognition model is trained and stored in the voiceprint recognition unit in advance.

11. A method for eliminating a specific object voice, comprising:
    obtaining a sound signal by a plurality of voice receiving units, mounted on the head of a user, arranged in an array;
    tracking a plurality of sound sources, based on the obtained sound signal, to obtain a plurality of sound source directions;
    adjusting the voice receiving units to enhance the sound source directions;
    cutting the sound signal into a plurality of windows;
    performing voiceprint recognition to each of the windows to determine whether the sound signal contains a specific object voice in each of the sound source directions;
    adjusting a field pattern using a beamforming technique to eliminate the specific object voice if the sound signal contains the specific object voice in one of the sound source directions; and
    outputting the sound signal with the specific object voice being eliminated to a left ear and a right ear, wherein the outputted sound signal is generated by two speakers mounted on the head of the user.

12. The method for eliminating the specific object voice according to claim 11, wherein the voice receiving units face different directions.

13. The method for eliminating the specific object voice according to claim 11, wherein the sound sources are tracked by using an interaural time difference (ITD) and a cross correlation function (CCF).

14. The method for eliminating the specific object voice according to claim 11, wherein the voice receiving units are adjusted by using a beamforming technique.

15. The method for eliminating the specific object voice according to claim 11, wherein each of the windows is greater than or equivalent to 32 milliseconds (ms).

16. The method for eliminating the specific object voice according to claim 11, wherein each interval between the windows is less than or equivalent to 5 milliseconds.

17. The method for eliminating the specific object voice according to claim 11, wherein the field pattern is progressively adjusted.

18. The method for eliminating the specific object voice according to claim 11, wherein the field pattern is progressively adjusted, and the field pattern is progressively restored.

19. The method for eliminating the specific object voice according to claim 11, wherein the field pattern is maintained if the sound signal does not contain the specific object voice in one of the sound source directions.

20. The method for eliminating the specific object voice according to claim 11, wherein a recognition model is trained and stored in the voiceprint recognition unit in advance.

* * * * *